United States Patent
Yokohata et al.

(10) Patent No.: US 6,985,315 B2
(45) Date of Patent: Jan. 10, 2006

(54) MAGNETIC DISK EVALUATION APPARATUS

(75) Inventors: Toru Yokohata, Kawasaki (JP); Yoshiharu Kasamatsu, Kawasaki (KP); Satoru Momose, Kawasaki (JP); Takayuki Yamamoto, Kawasaki (JP)

(73) Assignee: Fujitsu Limtied, Kawasaki (JP)

( * ) Notice: Subject to any disclaimer, the term of this patent is extended or adjusted under 35 U.S.C. 154(b) by 440 days.

(21) Appl. No.: 10/058,947

(22) Filed: Jan. 27, 2002

(65) Prior Publication Data

US 2003/0026015 A1 Feb. 6, 2003

(30) Foreign Application Priority Data

Jul. 18, 2001 (JP) ........................... 2001-218130

(51) Int. Cl.
*G11B 5/02* (2006.01)
*G11B 5/60* (2006.01)
*G01B 5/28* (2006.01)

(52) U.S. Cl. ............... 360/25; 73/105; 360/235.6; 360/236

(58) Field of Classification Search ............... 360/25, 360/234.3, 235.4, 235.5, 235.6, 236; 73/105
See application file for complete search history.

(56) References Cited

U.S. PATENT DOCUMENTS

| 5,824,920 | A | * | 10/1998 | Sugimoto et al. | ........ | 73/865.8 |
| 6,216,529 | B1 | * | 4/2001 | Burga et al. | ........ | 73/105 |
| 6,267,004 | B1 | * | 7/2001 | Ku et al. | ........ | 73/104 |
| 6,466,410 | B2 | * | 10/2002 | Polycarpou et al. | ........ | 360/236.6 |
| 6,577,466 | B2 | * | 6/2003 | Meyer et al. | ........ | 360/75 |

* cited by examiner

*Primary Examiner*—David Hudspeth
*Assistant Examiner*—Dan I Davidson
(74) *Attorney, Agent, or Firm*—Greer, Burns & Crain, Ltd.

(57) ABSTRACT

A magnetic disk evaluation apparatus includes an evaluation head for evaluating a magnetic disk, and a support member for supporting the evaluation head. The support member supports the evaluation head in a state where a flying surface of the evaluation head and a surface of a magnetic disk make a flying pitch angle of 95 μrad or more.

11 Claims, 7 Drawing Sheets

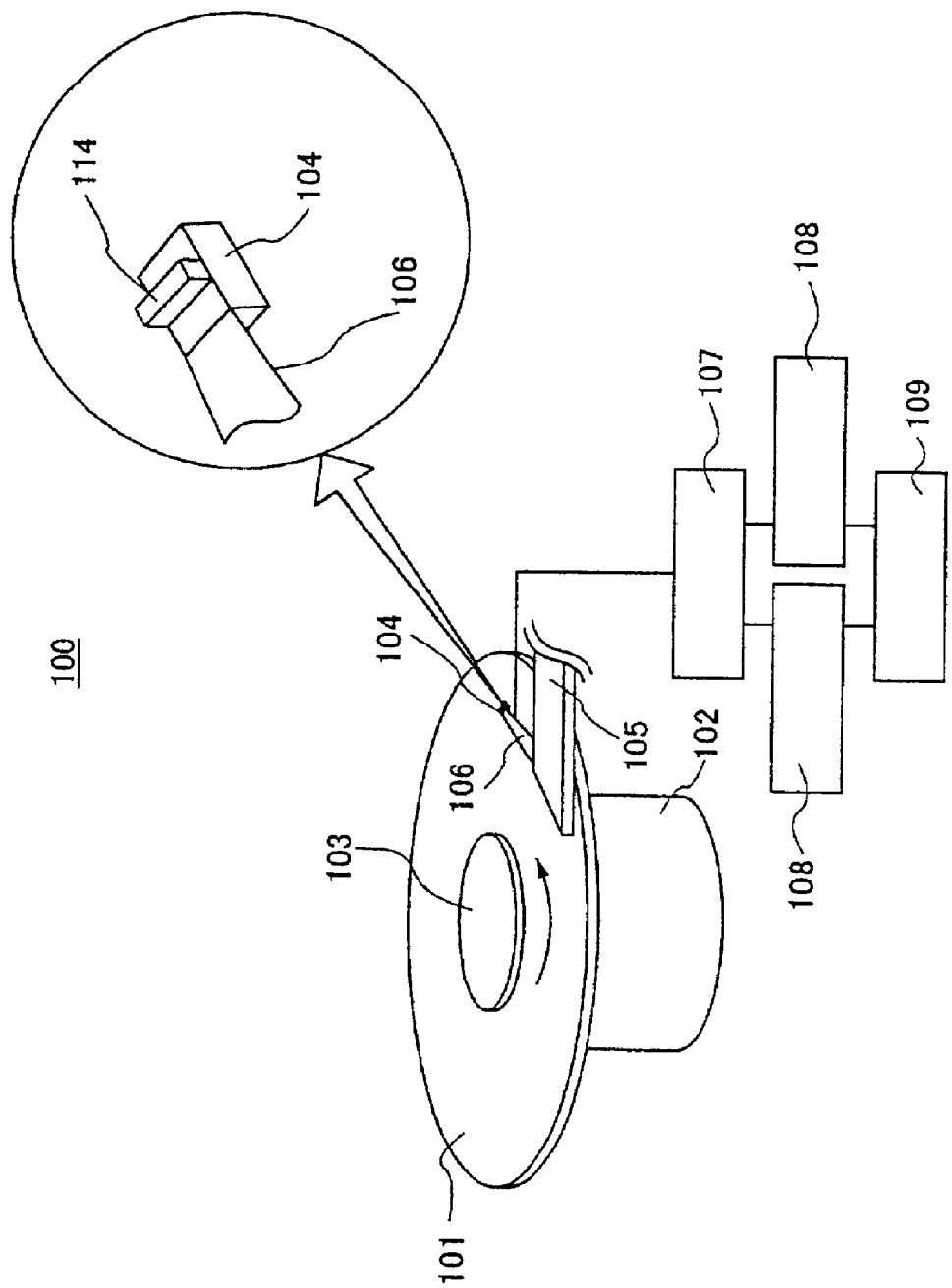

MAGNETIC DISK EVALUATION APPARATUS

BACKGROUND OF THE INVENTION

1. Field of the Invention

The present invention generally relates to magnetic disk evaluation apparatuses, and more particularly, to a magnetic disk evaluation apparatus for evaluating a reliability of a magnetic disk installed in a magnetic disk device utilized as an external storage of a computer and the like.

2. Description of the Related Art

Recently a magnetic disk device has a high recording density and is miniaturized. Hence, a flying-height, defined as a distance between a surface of a magnetic disk and a magnetic head which flies from the surface of the magnetic disk, becomes lower. In order to make the flying-height low, it is necessary to minimize the surface roughness of the surface of the magnetic disk.

Meanwhile, a contact start stop (CSS) method has been mostly utilized for the magnetic device up to now. In the CSS method, when the magnetic disk stops rotating, a surface of the magnetic head comes in contact with the surface of the magnetic disk. When the magnetic device rotates, the magnetic head flies from the surface of the magnetic disk because of an air flow occurring on the basis of a rotation of the magnetic disk. If the surface roughness of the magnetic disk is low, a contacting area between a contacting surface of the magnetic head and the surface of the magnetic disk when the magnetic disk does not rotate is large. Therefore, when the magnetic disk starts rotating, an obstacle may occur between the magnetic head and the magnetic disk, and thereby it may be difficult for the magnetic head to leave the magnetic disk. In order to solve the above-mentioned problem, a texture process for the surface of the magnetic disk is applied, and thereby a minute roughness is artificially provided on the surface of the magnetic disk.

Therefore, there are two kinds of demands with respect to the magnetic disk. One is minimizing the surface roughness of the surface of the magnetic disk, in order to minimize the flying-height of the magnetic head. The other is providing the minute roughness on the surface of the magnetic disk, in order to prevent a generation of the above-mentioned obstacle between the magnetic head and the magnetic disk.

However, one of the above-mentioned demands conflicts with the other. Accordingly, for a design of a magnetic disk device, it is necessary to meet both demands under well-balanced consideration. Because of this, a magnetic disk evaluation apparatus for evaluating a guaranteed flying height of the magnetic disk is needed for designing the magnetic disk device.

Next, a method of an evaluation of the guaranteed flying height will be described. A head for an evaluation of a glide height (hereinafter a "glide height evaluation head") can fly above the surface of the magnetic disk with a slightly lower flying-height from the surface of the magnetic disk than the flying-height of the magnetic head of the disk device product.

The glide height evaluation head also includes a contact detecting sensor such as a piezo-element for detecting a contact between the glide height evaluation head and the magnetic disk.

In the evaluation of the guaranteed flying height, when the flying-height of the glide height evaluation head is lower than a threshold value, the glide height evaluation head comes in contact with a part of the a convex part on the surface of the magnetic disk. If the flying-height of the glide height evaluation head is higher than a threshold value, the glide height evaluation head does not come in contact with the part of the convex part on the surface of the magnetic disk. Here, such threshold value, namely a lower limit value of the flying-height of the glide height evaluation head in a state where the glide height evaluation head does not come in contact with the magnetic disk, is called a "glide height". That is, the glide height is defined as a guaranteed flying height of the magnetic disk.

Generally a magnetic disk device is set up in a state where the magnetic head flies with a flying-height being slightly higher than the glide height. Hence, if the glide height of the magnetic disk device cannot be lower than a designated flying-height of the magnetic head, the magnetic disk device loses a reliability thereof.

Since a recent magnetic disk device has a high recording density, the glide height becomes lower and the glide height evaluation head has been required to have a higher stability of flying. Furthermore, it is necessary to evaluate the magnetic disk more accurately on the basis of a detected signal which is output when the glide height head comes in contact with the magnetic disk.

However, the above-mentioned magnetic disk evaluation apparatus has a plural kinds of problems as follows.

A first problem will be described. Recently the flying-height of the magnetic head has become lower. Since the glide height evaluation head is required to have the lower flying-height than such the flying-height, a serious problem occurs if the glide height evaluation head loses a stability of the flying.

Thus, once a problem of an un-stable flying of the glide height evaluation head occurs, it may be difficult to evaluate the magnetic disk accurately. The reason why such unstable flying occurs can be presumed as follows, in proportion as a case of the magnetic head.

(1) First of all, a lubricant, a contamination such as a minute and dirty molecule, or the like, moves from the surface of the magnetic disk and absorbs onto a flying surface of the glide height evaluation head which flies with a low flying-height.

(2) Next, if an amount of the absorption onto the flying surface increases to a designated amount or more, the flying property of the glide height evaluation head is changed, and thereby the flying-height of the glide height evaluation head is changed. The flying-height is declined in many cases. In a worst case, the glide height evaluation head may fall down onto the surface of the magnetic disk device, and thereby the glide height evaluation head may slide on the surface of the magnetic disk.

(3) After an absorbed material onto the flying surface of the glide height evaluation head is removed because of sliding, the glide height evaluation head may have the designated flying-height again, and thereby the glide height evaluation head flies stably again.

(4) The processes of the above mentioned (1) to (3) are repeated irregularly. Because of this, it may be difficult to keep a stable flying for a long period of time.

According to the above-mentioned presumption, the absorption of the lubricant, contamination, or the like onto the flying surface of the glide height evaluation head may be a main reason why the unstable flying occurs. However, if the unstable flying occurs actually and the glide height evaluation head is changed, the situation of the unstable flying is also changed. Hence, it is clarified that the above-mentioned situation of the unstable flying is not as simple as it is understood on the basis of the above-mentioned presumption.

Next, a second problem will be described. It is a main object of the evaluation by the conventional magnetic disk evaluation apparatus to decide whether or not the surface of the magnet disk has an unusual convex part. For the purpose, the glide height evaluation head flies with a designated flying-height namely a glide height and runs above the surface of the magnetic disk which rotates, and thereby makes a decision of whether or not the convex part comes in contact with the glide height evaluation head exists on the magnetic disk. The contact detecting sensor such as the piezo-element for detecting the contact between the glide height evaluation head and the convex part of the magnetic disk is provided in the glide height evaluation head.

However, as described above, it is necessary to decrease the flying-height of magnetic head. Hence, not only the contact between the convex part of the surface of the magnetic disk and the magnetic head but also a partial convex part of the lubricant generated by a lack of uniformity of applying the lubricant on the surface of the magnetic disk and the magnetic head, may be apt to occur as another problem.

Therefore, it is necessary to detect the lubricant having a convex shape and formed due to the lack of uniformity of applying the lubricant, by the magnetic disc evaluation apparatus. However, the conventional magnetic disc evaluation apparatus has a structure for detecting a contact with the convex part (solid) on the surface of the magnetic disk. Accordingly, up to now, there is neither an idea to detect a convex part of the lubricant (liquid) nor a suggestion about an effective evaluation thereof.

In the conventional magnetic disk evaluation, in order to detect the contact between the glide height evaluation head and the convex part on the magnetic disk, a vibration frequency of the glide height evaluation head which is an object of the operation is set as for example approximately 200 to 800 kHz. The glide height evaluation head coming in contact with the solid convex part has a tendency in that the glide height evaluation head vibrates with a high frequency of 200 kHz or more for example.

Accordingly, it is judged that the glide height evaluation head comes in contact with the solid convex part, if a signal ingredient having a higher frequency than 200 kHz in the detected signals detected by a contact detect sensor exceeds a designated value. Furthermore, a vibration based on a lower frequency than 200 kHz is eliminated from an object to be detected because it can be presumed that the vibration based on the lower frequency than 200 kHz may be caused by an influence of a vibration of an air film near the glide height evaluation head.

SUMMARY OF THE INVENTION

Accordingly, it is a general object of the present invention is to provide a novel and useful magnetic disk evaluation apparatus in which an accurate evaluation of the magnetic disk can be realized by a glide height evaluation head which can keep a stable flying, or a novel and useful magnetic disk evaluation apparatus for detecting a convex part of a lubricant on the surface of the magnetic disk which is not an object to detect conventionally, where one or more of the problems described above are eliminated.

Another and more specific object of the present invention is to provide a magnetic disk evaluation apparatus, including an evaluation head for evaluating a magnetic disk, and a support member for supporting the evaluation head, wherein the support member supports the evaluation head in a state where a flying surface of the evaluation head and a surface of a magnetic disk make a flying pitch angle of 95 $\mu$rad or more.

The support member may support the evaluation head at a position of 0.78L or more from an air inflow end part of the evaluation head, where L is defined as a whole length of the evaluation head in an airflow direction.

In the magnetic disk evaluation apparatus, a load of 3.5 gf or more may be provided to the evaluation head by the support member.

In the magnetic disk evaluation apparatus, the evaluation head may have a negative pressure inducing configuration, and thereby a negative pressure to attract the evaluation head to the magnetic disk on the basis of an airflow caused by a rotation of the magnetic disk may be generated.

In the magnetic disk evaluation apparatus, a rigidity of an air film formed between the evaluation head and the magnetic disk may be 0.33 gf/nm or more.

In the magnetic disk evaluation apparatus, a lower limit value of a flying-height of the evaluation head from the surface of the magnetic disk in a state where the glide height evaluation head may not be in contact with the magnetic disk may be evaluated by the evaluation head.

According to the above-mentioned magnetic disk evaluation apparatus, it is possible to control a generation of un-stable flying even in case of that a flying-height of the evaluation head is made low. Therefore, it is possible to provide a magnetic disk evaluation apparatus evaluating the magnetic disk accurately. As a result of this, it is possible to provide a magnetic disk having a high reliability to a customer with a low price.

Still another object of the present invention is to provide a magnetic disk evaluation apparatus including an evaluation head, including a contact detect means for detecting a contact with a magnetic disk on which a lubricant is applied and outputting a detected signal, a detected signal dividing means for dividing the detected signal into frequency components of a first frequency band which are generated based on a contact between a convex part of the magnetic disk and the evaluation head, and frequency components of a second frequency band which are generated based on a contact between a convex part of the lubricant and the evaluation head, and a contact decision means which is connected to the detected signal dividing means, and detects a contact of the evaluation head with the convex part of the lubricant in response to detection of a signal component exceeding a designated threshold only in the second frequency band.

In the magnetic disk evaluation apparatus, the evaluation head may include a flying surface, and at least part of the flying surface is formed by a film of a protection material selected from a group consisting of an amorphous carbon, a diamond like carbon, a diamond like carbon to which hydrogen is added, and a diamond like carbon to which nitride is added.

In the magnetic disk evaluation apparatus, at least part of the formed film of the protection material may be fluoride-processed.

In the magnetic disk evaluation apparatus, a convex part projecting towards the magnetic disk may be formed on a part of the formed film of the protection material.

In the magnetic disk evaluation apparatus, the contact decision means may further decide that the evaluation head comes in contact with the convex part of the magnetic disk in case of that a signal component exceeding a designated threshold value at least in the first frequency band is included in the detect signal.

In the magnetic disk evaluation apparatus, the first frequency band and the second frequency band may be separated by a border frequency selected from 100–500 kHz on a basis of a configuration of the evaluation head.

According to the above-mentioned invention, it is possible to know a height of the convex part of the lubricant applied on the surface of the magnetic disk which is conventionally un-known and realize whether or not the height of the convex part of the lubricant gives bad influence to an activity of the magnetic disk device.

When the glide height evaluation head comes in contact with the convex part of the solid magnetic disk, the glide height evaluation head has a tendency to vibrate with a relatively high frequency. Hence, it is possible to divide the detected signals into frequency components of a first frequency band to which a signal ingredient generated by contacting the glide height evaluation head with the convex part on the magnetic disk belongs and a second frequency band to which a signal ingredient generated by contacting the glide height evaluation head with the convex part of the lubricant belongs, where 200 kHz is a threshold frequency.

The glide height evaluation head for the magnetic disk evaluation apparatus has various configuration and is assumed that the glide height evaluation head will be more miniaturized in future. Therefore, the threshold value is not limited to 200 kHz but selected from 100–500 kHz based on the configuration of the glide height evaluation head.

Other objects, features, and advantages of the present invention will be more apparent from the following detailed description when read in conjunction with the accompanying drawings.

BRIEF DESCRIPTION OF THE DRAWINGS

FIG. 9 is a diagrammatic illustration of a magnetic disk evaluation apparatus according to a fifth embodiment of the present invention;

DETAIL DESCRIPTION OF THE PREFERED EMBODIMENTS

A description regarding embodiments of an electric contact and a connector according to the present invention will now be given, with reference of FIGS. 1 to 10.

Inventors realized conditions for stable flying of a glide height evaluation head such as a flying pitch angle, a support point of the glide height evaluation head, a load provided from a support member to a glide height evaluation head, a configuration of a flying surface of the glide height evaluation head, a rigidity of an air film between the glide height evaluation head and the magnetic head, and others, through their experiments, as follows.

Figure 1:
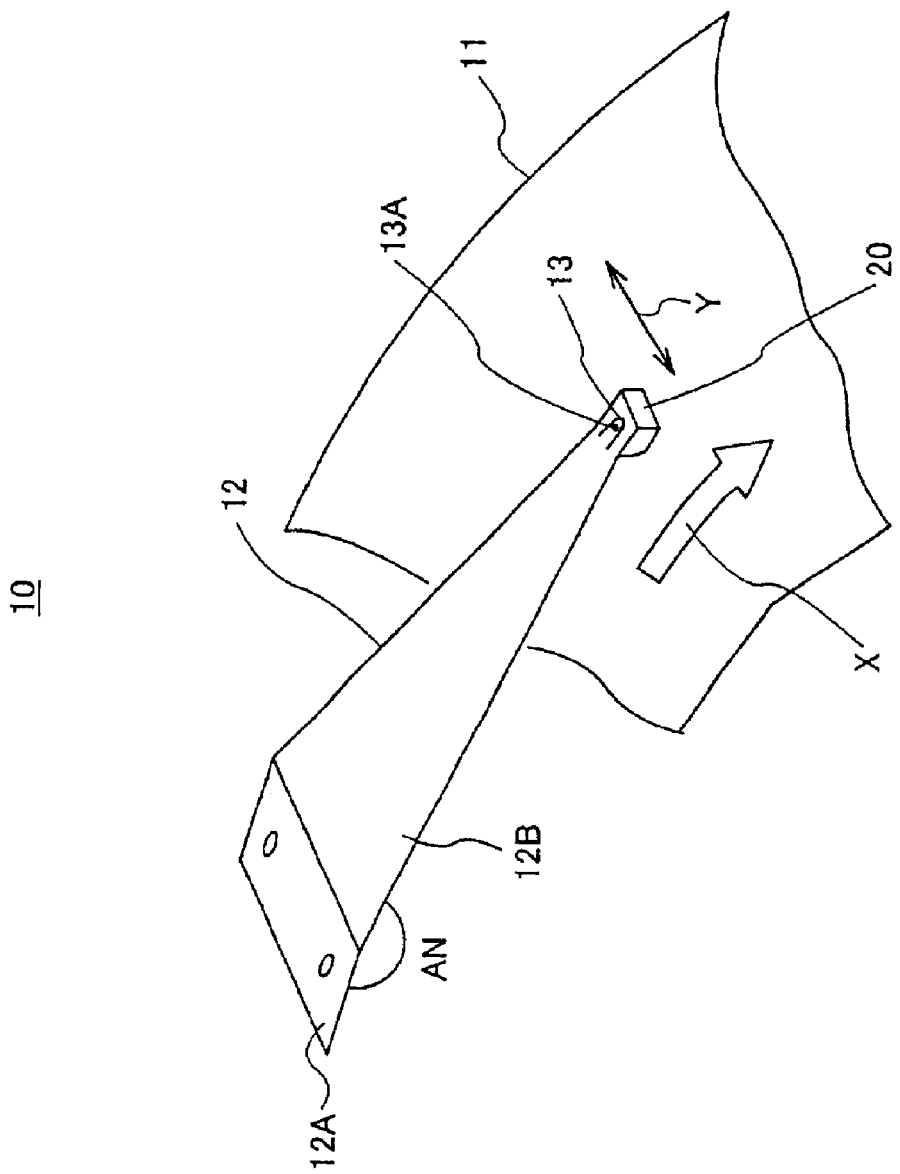
FIG. 1 is a diagrammatic illustration of a glide height evaluation head of a magnetic disk evaluation apparatus according to a first embodiment of the present invention and a periphery of a magnetic disk.

Referring to FIGS. 1 to 4, a magnetic disk evaluation apparatus according to a first embodiment of the present invention will be described. FIG. 1 is a diagrammatic illustration of a glide height evaluation head 20 of a magnetic disk evaluation apparatus 10 according to a first embodiment of the present invention and a periphery of a magnetic disk 11.

The magnetic disk 11 rotates at a designated number of rotation to a direction shown by arrow X. A glide height of the magnetic disk 11 is evaluated by the glide height evaluation head 20 in a state where the glide height evaluation head 20 approaches and faces an upper surface of the magnetic disk 11. The glide height evaluation head 20 is fixed at a head end part of a suspension 12 which is a support member extending from a side of a magnetic disk device body and having a spring ability and a rotating-movability. A tongue chip part 13 is provided at the head end part of the suspension 12. The tongue chip part 13 is formed by cutting a part of the head end part of the suspension 12. The glide height evaluation head 20 is fixed beneath a support point 13A provided in the tongue chip 13.

The suspension 12 is made of a spring material and includes a base part 12A and an arm part 12B. The arm part 12B is bent from the base part 12A with a designated bending angle AN. Hence, a load, by which the glide height evaluation head 20 can be pushed down to a side of the magnetic disk 11, can be generated. It is possible to arrange the load as a spring pressure (gf) to the glide height evaluation head 20 by arranging the bending angle AN.

FIG. 2A is an enlarged view for showing a flying surface of the glide height evaluation head 20 seen from a side of the magnetic disk 11 according to the present invention. FIG. 2B is a side view of the glide height evaluation head 20 in a state where the glide height evaluation head 20 is provided above the magnetic disk 11 according to the present invention.

Referring to FIGS. 2A and 2B, a schematic configuration of the glide height evaluation head 20 will be described. A taper part 25 is formed at a rear end part of the glide height evaluation head 20, and thereby an airflow generated by a rotation of the magnetic disk 11 to a direction shown by the arrow X can stream easily. Besides, the glide height evaluation head 20 includes a head slider part provided at both sides of the flying surface of the glide height evaluation head 20. The head slider part includes rails 21 and 22 having higher heights than a height of an center part of the glide height evaluation head 20.

A support point 24 of the glide height evaluation head 20 is fixed with the support point 13A of the suspension 12, and thereby the glide height evaluation head 20 is fixed with the suspension 12. A position of the support point 24 is mentioned as a cross mark in FIGS. 2A and 2B.

In this embodiment, the support point 24 is positioned with a length of 0.8 L plus or minus 0.02 L from an end part of the taper 25 namely an air inflow end part, where L is defined as a full length of the glide height evaluation head 20. Because of the above-mentioned position regarding the support point 24, it is possible to make approximately 100 $\mu$rad or more of a flying pitch angle $\alpha$, where the flying pitch angle $\alpha$ is defined as an angle between the flying surface of the glide height evaluation head 20 and the surface of the magnetic disk 11 as shown in FIG. 2A.

According to inventors' experiments, for the stable flying of the glide height evaluation head 20, it is effective that the flying pitch angle $\alpha$ is at least 95 $\mu$rad or more, preferably 100 $\mu$rad or more. For the above-mentioned situation, the support point 24 is positioned with a length of 0.78 L or more from the air inflow end part of the taper 25, where L is defined as the full length of the glide height evaluation head 20.

In the first embodiment, as an example, the support point 24 is positioned with a length of approximately 0.8 L from the air inflow end part. The position of the support point 24, however, is not limited to the above-mentioned example. Rather, it is possible to make a flying pitch angle $\alpha$ of 95 $\mu$rad or more by making the support point 24 positioned with a length of 0.78 L or more from the air inflow end part. Thereby, it is possible to make a position of the air inflow end part of the glide height evaluation head 20 arise more than the conventional glide height evaluation head. The above-mentioned position of the air inflow end part of the glide height evaluation head 20 contributes a stable flying of the glide height evaluation head 20, while a reason thereof will be described later.

Figure 3:
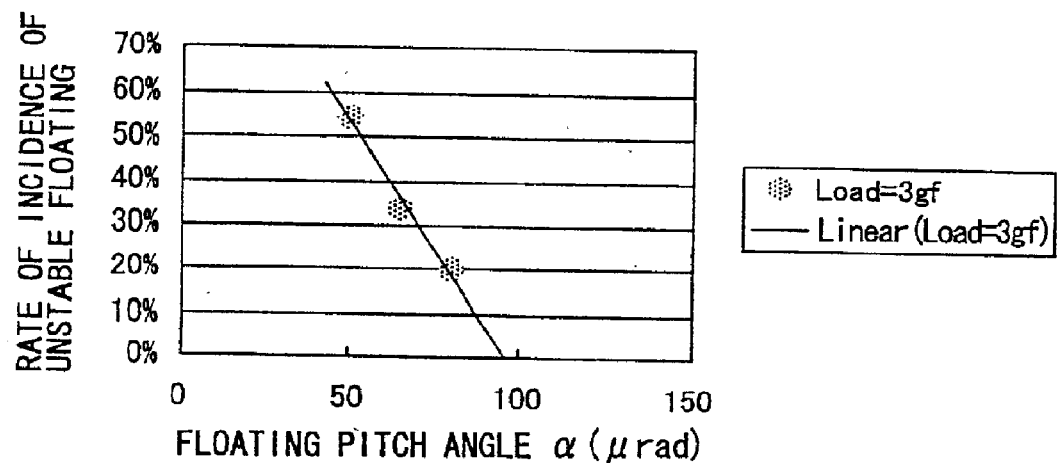
FIG. 3 is a graph showing a relationship between a rate of an incidence of an unstable flying of the glide height evaluation head and a flying pitch angle α according to the present invention.

FIG. 3 is a graph showing a relationship between a rate of an incidence of an unstable flying of the glide height evaluation head 20 and a flying pitch angle $\alpha$.

Conditions for measuring data in the experiments by using a plural of the glide height evaluation heads, shown in FIG. 3, are as follows. A peripheral speed of the magnetic disk 11 was constant. The flying-height of the glide height evaluation head 20 was substantially constant. The flying pitch angle $\alpha$ was changed variously in a state where the spring pressure of the suspension 12 was constant of 3 gf. The glide height evaluation head 20 was pushed down to the side of the magnetic disk 11 by the spring pressure.

In the experiment, the glide height was measured as a designated and shorter flying-height than the flying-height of the magnetic head used for the magnetic disk device. Besides, a rate of the incidence of the unstable flying of the glide height evaluation head 20 was defined as a ratio of a fall of the glide height evaluation head 20 down onto the surface of the magnetic disk 11.

As shown in FIG. 3, when the glide height evaluation head 20 had a flying-pitch $\alpha$ of 95 $\mu$rad or more, or 100 $\mu$rad or more for an accurate operation of the device, the glide height evaluation head 20 had a rate of the incidence of the unstable flying of zero. That is, for the stable flying of the glide height evaluation head 20, it was effective to have the flying pitch $\alpha$ of 95 $\mu$rad. In order to achieve the above-mentioned stable flying, it was necessary to make the support point 24 positioned with a length of 0.78 L or more from the air inflow end part.

Figure 4:
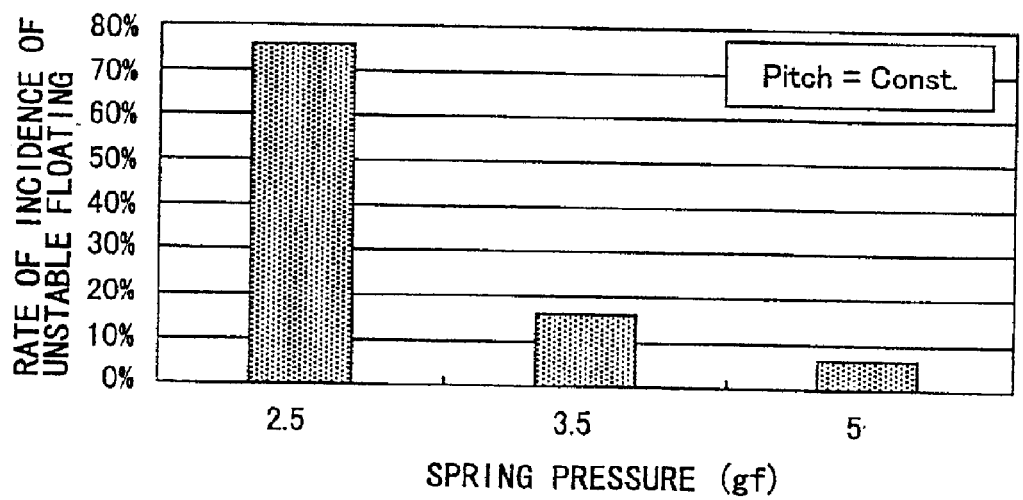
FIG. 4 is a graph showing a relationship between a rate of an incidence of an unstable flying of the glide height evaluation head and a spring pressure (gf) of a suspension according to the present invention.

FIG. 4 is a graph showing a relationship between a rate of an incidence of an unstable flying of the glide height evaluation head 20 and a spring pressure (gf) of the suspension 12 according to the present invention. The inventors realized a suitable spring pressure for the stable flying of the glide height evaluation head 20, through further experiment of a spring pressure provided from the suspension 12 to the glide height evaluation head 20. The inventors further realized a proper strength of an air spring formed between the glide height evaluation head 20 and the magnetic disk 11.

Conditions for measuring data in the experiment by using a plural of the glide height evaluation head, shown in FIG. 4, are as follows. The peripheral speed of the magnetic disk 11 was constant. Both of the flying-height of the glide height evaluation head 20 and the flying pitch angle $\alpha$ were substantially constant. The spring pressure of the suspension 12 by which the glide height evaluation head 20 was pushed down onto the side of the magnetic disk 11 is changed variously. In the experiment, when the spring pressure was made high, the widths of the rails 21 and 22 were widen, and thereby an necessary airflow streams beneath the glide height evaluation head 20. In the experiment, a lower designated height than the flying-height of the magnetic head used for the magnetic disk device was measured. Besides, a rate of the incidence of the unstable flying of the glide height evaluation head 20 was defined as a ratio of a fall of the glide height evaluation head 20 down onto the surface of the magnetic disk 11.

As shown in FIG. 4, there is a tendency in that the ratio of the unstable flying is restrained as the spring pressure (gf) of the suspension 12 becomes higher. A relationship among the spring pressure, a rigidity of an air film, and the rate of the incidence of the unstable flying is shown in the following TABLE 1.

TABLE 1

| Spring Pressure | Rate of Incidence of Unstable Flying | Rigidity of Air Film |
|---|---|---|
| 2.5 gf | 76% | 0.22 gf/nm |
| 3.5 gf | 16% | 0.33 gf/nm |
| 5.0 gf | 6% | 0.40 gf/nm |

The rigidity of an air film shows a strength (rigidity) of the air spring formed between the glide height evaluation head 20 and the magnetic disk 11. It can be presumed the glide height evaluation head 20 flies when the air spring pushes up the glide height evaluation head 20. Furthermore, since the glide height evaluation head 20 is pressed by the spring pressure of the suspension 12, flying of the glide height evaluation head 20 can be kept when the pressures of the air spring and the suspension 12 are balanced.

The inventors experimented on the basis of the presumption of that the pressure of the air spring became higher as the pressure of the suspension became higher in order to keep flying of the glide height evaluation head, and calculated a value of the rigidity of the air film.

A unit of the value of the rigidity of the air film is "gf/nm" and shows a spring constant in a case of a height direction of the magnetic disk 11. The spring constant becomes larger as the air spring has higher spring pressure.

As shown in TABLE 1, the rigidity of the air film becomes larger as the spring pressure becomes higher. When the rigidity of the air film is large, an air spring between the glide height evaluation head 20 and the magnetic disk 11 is rigid. Therefore, in terms of the rigidity of the air film, if conditions of the glide height evaluation head 20 are fixed as the rigidity of the air film becomes large, it may be difficult to have a generation of a situation in that the glide height evaluation head 20 comes in contact with the magnetic disk 11.

The spring pressure 2.5 gf shown in FIG. 4 is a spring pressure applied for the conventional magnetic disk evaluation apparatus. Conventionally, an unstable flying problem did not occur substantially because a designated glide height was high. However, a value of a glide height such as 8–11 nm is designated in the magnetic disk evaluation apparatus of the first embodiment according to the present invention. If the conventional spring pressure of 2.5 gf was utilized for the magnetic disk evaluation apparatus having such low glide height, the unstable flying occurs having a rate of the incidence of 76%, and thereby such magnetic disk evaluation apparatus cannot be used practically.

However, when the spring pressure of 3.5 gf or 5.0 gf was used, the rate of the incidence of the unstable flying was remarkably decreased. This may be because the pressure of the air spring becomes high as the pressure of the suspension becomes high in order to keep the flying situation.

Accordingly, it is preferable that the spring pressure of the downward load provided to the glide height evaluation head 20 is set as 3.5 gf or more, more preferably 5.0 gf or more. Also it is preferable that the value of the rigidity of the air film is set as preferably 0.33 gf/nm or more, more preferably 0.40 gf/nm or more.

Figure 5:
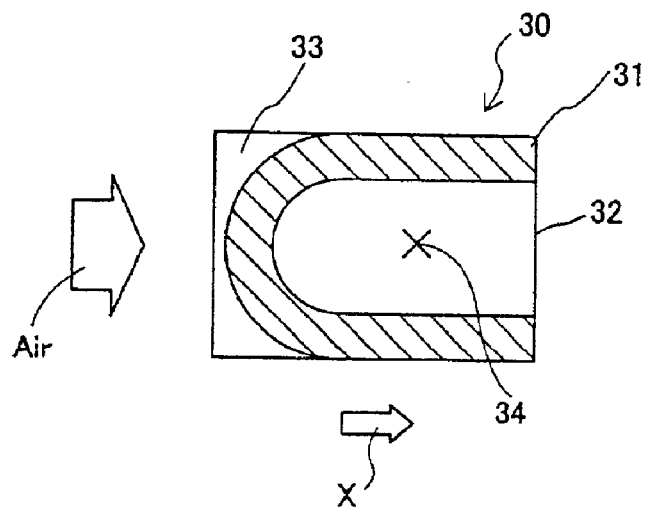
FIG. 5 is a view for showing a flying surface of the glide height evaluation head seen from a magnetic disk side of according to a second embodiment of the present invention.

Referring to FIG. 5, a magnetic disk evaluation apparatus according to a second embodiment of the present invention will be described.

FIG. 5 is a view for showing a flying surface of the glide height evaluation head seen from a magnetic disk side of according to a second embodiment of the present invention.

The magnetic disk evaluation apparatus of the second embodiment has a substantially similar structure with the magnetic disk evaluation apparatus of the first embodiment. Since the glide height evaluation head 30 has a specific feature, only an explanation thereof will be described.

A negative pressure induction configuration is provided on a flying surface of the glide height evaluation head 30 according to the second embodiment of the present invention. In the negative pressure induction configuration, a negative pressure occurs by utilizing an airflow generated to a side of a flying surface by a rotation of the magnetic disk. Hence, when the negative pressure occurs by the rotation of the magnetic disk, the glide height evaluation head 30 is absorbed to a side of the magnetic disk with a designated pressure.

Compared to the first embodiment, in this embodiment, it is possible to move a support point 34 of the glide height evaluation head 30 to a center side. Besides, it is possible to make a spring pressure of a suspension not shown in FIG. 5 weak. That is, the glide height evaluation head 30 in the second embodiment can have substantially same effect as the glide height evaluation head 20 in the first embodiment under rougher conditions than the conditions of the glide height evaluation head 20 in the first embodiment.

Referring to FIG. 5, a schematic configuration of the glide height evaluation head 30 will be described. The flying surface of the glide height evaluation head 30 includes an airflow obstacle wall part 31 having a U shape. A bending part of the airflow obstacle wall part 31 is formed at the air inflow side of the flying surface. A straight line part of the airflow obstacle wall part 31 has an air bearing surface (ABS) through which the airflow inflows beneath the glide height evaluation head 30 as well as the rails 21 and 22 of the first embodiment.

An outer plate part 33 is formed at an outer circumference of the bending part of the airflow obstacle wall part 31 and at a lower place by approximately 0.2 $\mu$m from the surface of the airflow obstacle wall part 31. An inner plate part 32 is formed at a place where the airflow obstacle wall part 31 surrounds and at a lower place by approximately 2.0 $\mu$m from the surface of the airflow obstacle wall part 31.

Thus, the glide height evaluation head 30 of the second embodiment has a flying surface of a negative pressure applied type head slider, in which the negative pressure induction configuration is formed, thereby airflow inflows beyond the bending part of the airflow obstacle wall part 31 by the rotation of the magnetic disk and a negative pressure occurs.

In this embodiment, it is preferable that the glide height evaluation head 30 has a position of the support point of the suspension of approximately 0.6 L from the air inflow end part and a spring pressure of approximately 2 gf as well as in the first embodiment, and thereby a flying pitch angle of 95 $\mu$rad or more and a rigidity of an air film of 0.33 gf/nm or more can be achieved.

Advantages achieved by the glide height evaluation head 30 for which the negative pressure is applied are as follows.

Firstly, it is possible to make the rigidity of the air film high by making the spring pressure low. Because of this, when the glide height evaluation head 30 falls down onto and slides on the surface of the magnetic disk, neither positive nor negative pressure occurs to the glide height evaluation head 30. Thus, a contacting force between the glide height evaluation head 30 and the magnetic disk is consisted of only a weak spring pressure. Hence, it is possible to make the contacting force low in a case where the glide height evaluation head 30 slides on the surface of the magnetic disk. Therefore, it is possible to make the contact and slide of the glide height evaluation head 30 and the magnetic disk smooth, and thereby it is possible to recover quickly from a situation of falling down to a normal flying situation even if the glide height evaluation head falls down onto the surface of the magnetic disk.

Secondly, it is possible to make the spring pressure low against a designated rigidity of the air film pressure. Therefore, it is possible to make the bending angle AN of the suspension shown in FIG. 1 low. Hence, it is possible to reduce a restriction of the magnetic disk evaluation apparatus, and thereby an excessive application device can be avoided to be set.

Next, referring to FIG. 6, a glide height evaluation head of a third embodiment will be described.

In the glide height evaluation head of the third embodiment, a protection film for controlling an absorption is formed on the ABS formed on the flying surface side of the glide height evaluation head. A glide height evaluation head 40 which is improvement of the glide height evaluation head 20 shown in FIG. 2 will be described.

Figures 6A, 6B:
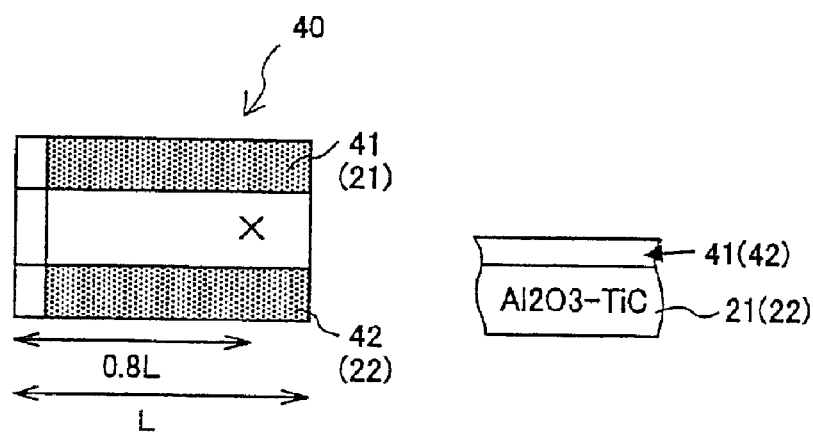
FIG. 6A is a view for showing a flying surface of a glide height evaluation head seen from a magnetic disk side according to a third embodiment of the present invention.
FIG. 6B is a view showing a state of a DLC film of the glide height evaluation head according to the third embodiment of the present invention.

FIG. 6A is a view for showing a flying surface of the glide height evaluation head 40 seen from a magnetic disk side according to a third embodiment of the present invention. In this embodiment, films 41 and 42 are formed on the rails 21 and 22 which have the ABS respectively by applying carbon materials.

As shown in FIG. 6B, for example a diamond-like-carbon (DLC) film having a thickness of approximately 3 nm is formed on the rails 21 and 22 such as an $Al_2O_3$—TiC material.

As well as the glide height evaluation head 20 in the first embodiment, a rate of an incidence of an unstable flying regarding the glide height evaluation head 40 in the fourth embodiment was investigated used under a combination of the suspension 12 having a spring pressure of 3.5 gf. A result of the investigation will be shown in TABLE 2. As shown in TABLE 2, if a DLC film is formed on the flying surface of the glide height evaluation head, the rate of the incidence of the unstable flying is decreased.

In the third embodiment, the same effect as the above described effect can be achieved, even when an amorphous carbon, a diamond like carbon to which hydrogen is added, a diamond like carbon to which nitride is added, or the like is used as a material for forming on the rails 21 and 22 instead of the DLC as a film material.

As shown in TABLE 2, when the surfaces of the DLC films 41 and 42 are further fluoride-processed, a rate of a generation of an absorption is further decreased. This may be because an amount of moving and absorption of the lubricant applied on the surface of the magnetic disk to the glide height evaluation head 30 is decreased on the basis of an effect of a fluoride-process.

TABLE 2

| Rate of Incidence of Unstable Flying (Spring Pressure: 3.5 gf) | | |
| --- | --- | --- |
| None of DLC | 3 nm of DLC | 3 nm of DLC and Fluoride-Process |
| 15% | 13% | 9% |

Figure 7:
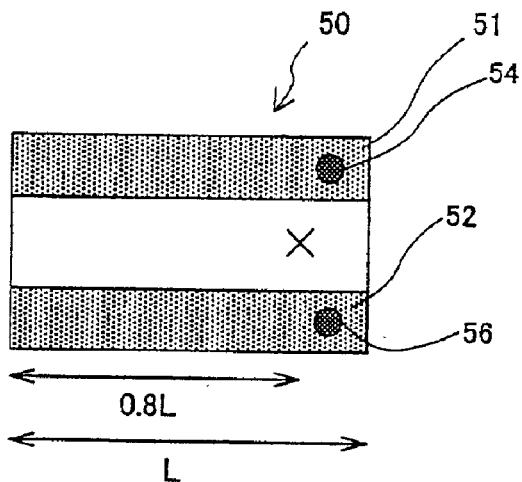
FIG. 7 is a view for showing a flying surface of the glide height evaluation head seen from a magnetic disk side of according to a fourth embodiment of the present invention.

Referring to FIGS. 7 and 8, a glide height evaluation head of the fourth embodiment will be described.

Figure 2:
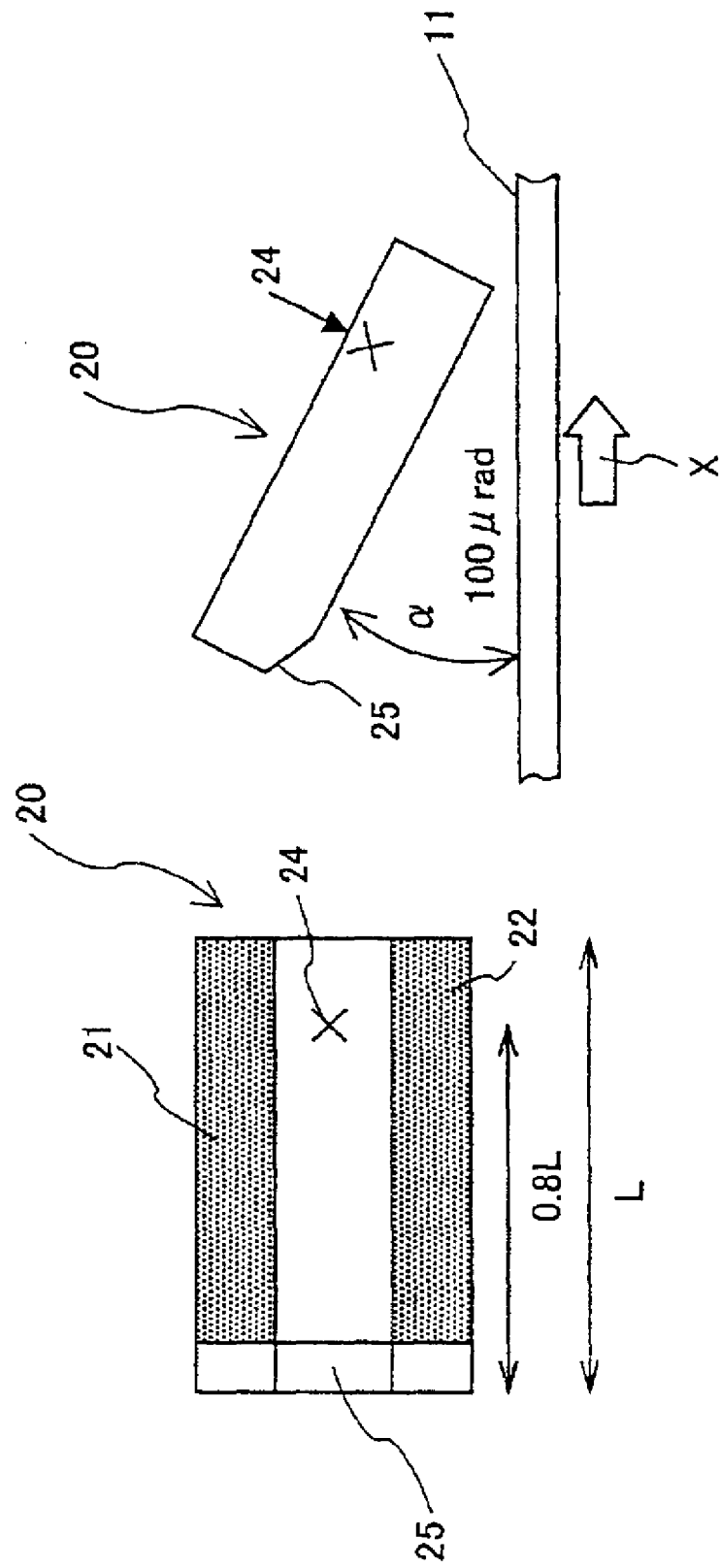
FIG. 2A is a view for showing a flying surface of the glide height evaluation head seen from a magnetic disk side according to the present invention.
FIG. 2B is a side view of the glide height evaluation head in a state where the glide height evaluation head is provided above the magnetic disk according to the present invention.

The glide height evaluation head 40 in the third embodiment, which is based on the glide height evaluation head 20 in the first embodiment shown in FIG. 2, is modified for the fourth embodiment.

FIG. 7 is a view for showing a flying surface of a glide height evaluation head 50 seen from a magnetic disk side of according to a fourth embodiment of the present invention. Referring to FIG. 7, convex parts 54 and 56 are respectively formed on the DLC films 51 and 52. The convex parts 54 and 56 are positioned near the air outflow end part, and thereby it may be easy to realize the position of the convex parts of the magnetic disk.

FIG. 8 is a view showing a manufacturing process of the convex parts made of DLC. Referring to FIG. 8, the DLC film forming a material for the convex part and having a thickness of approximately 40 nm is formed on $Al_2O_3$—TiC, as shown in FIG. 8A. The DLC having a convex shape is formed by a photolithography technology such as a photomask MAS shown in FIG. 8B and a resist RES shown in FIG. 8C, and a reactive ion etching shown in FIG. 8D.

Figure 8A:
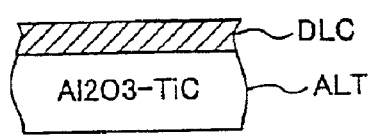
FIG. 8A is a view showing a manufacturing process of the glide height evaluation head according to the fourth embodiment of the present invention.
Figure 8B:
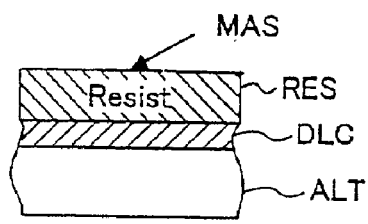
FIG. 8B is a view showing a manufacturing process of the glide height evaluation head according to the fourth embodiment of the present invention.
Figure 8C:
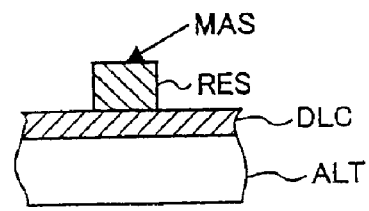
FIG. 8C is a view showing a manufacturing process of the glide height evaluation head according to the fourth embodiment of the present invention.
Figure 8D:
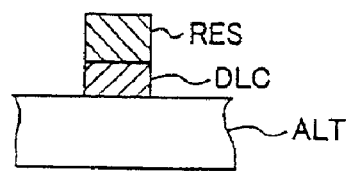
FIG. 8D is a view showing a manufacturing process of the glide height evaluation head according to the fourth embodiment of the present invention.

If conditions for remaining a thickness in a range of approximately 3–5 nm of the DLC film on a plain part which is a part other than the convex part is selected, the above-mentioned effect of the third embodiment can be achieved, in a process of forming a convex part shown in FIG. 8D.

As well as the glide height evaluation head 20 in the first embodiment, a rate of an incidence of an unstable flying regarding the glide height evaluation head 50 in the fourth embodiment is investigated under a combination of the suspension 12 having a spring pressure of 3.5 gf. A result of the investigation will be shown in TABLE 3. As shown in TABLE 3, if a convex part is formed on the DLC film, the rate of the incidence of the unstable flying is decreased by more than 2%.

Since the glide height evaluation head 50 in this embodiment includes the convex part, the contacting area in a state of sliding and a moving-friction force is reduced. Even if the glide height evaluation head falls down onto the surface of the magnetic disk, a moment for making a flying pitch lead to negative direction is decreased. As a result of this, it is possible to recover a situation of falling down onto normal flying state immediately.

TABLE 3

| Rate of Incidence of Unstable Flying (Spring Pressure: 3.5 gf) | | |
| --- | --- | --- |
| None of DLC | 3 nm of DLC | 3 nm of DLC and Forming Roughness on DLC Film |
| 15% | 13% | 11% |

The glide height evaluation head 30 can be improved as well as the glide height evaluation head 20 of the first embodiment is improved for the third and fourth embodiments.

Next, inventors examined a vibration of the glide height evaluation head. As a result of this, the inventors realized that a signal in a state where the glide height evaluation head comes in contact with a convex part of the lubricant was included in the signal ingredient which was eliminated conventionally as a signal of an air film vibration.

That is, it is realized that the glide height evaluation head has a relatively high frequency in case of that the glide height evaluation head comes in contact with a solid convex part on the magnetic disk; and the glide height evaluation head has a low frequency in case of that the glide height evaluation head comes in contact with a liquid lubricant having a convex shape. For instance, it is possible to detect a contact between the glide height evaluation head and the lubricant on the magnetic disk by dividing detected signals into frequency band areas. One of the frequency band areas is 200 kHz or more and the other is less than 100 kHz. These areas should be objects of the operation separately. Thereby it is possible to detect a contact between the glide height evaluation head and the lubricant on the magnetic disk.

Details of the above-mentioned invention will be described as a fifth embodiment as follows. FIG. 9 is a diagrammatic illustration of a magnetic disk evaluation apparatus 100 suitable according to the fifth embodiment of the present invention.

A magnetic disk 101 is clamped by a clamp 103 of a spindle motor 102. The magnetic disk 101 rotates as the spindle motor 102 rotates to a direction shown by an arrow in FIG. 9. When a glide height evaluation head 104 is positioned above the magnetic disk 102, the glide height evaluation head 104 flies from a surface of the magnetic disk 101 by airflow generated by a rotation of the magnetic disk. The glide height evaluation head 104 is moved to a radius direction above a whole of an upper surface of the magnetic disk 101.

The glide height evaluation head 104 is provided on the end part of a suspension 106 supported by a head support arm 105. As enlargedly shown in FIG. 9 regarding a periphery of the glide height evaluation head 104, a piezoelectric element 114 is arranged on the glide height evaluation head 104. A vibration of the glide height evaluation head 104 is detected by the piezoelectric element 114. An output signal of the piezoelectric element 114 is connected with an amplifier 107 to be amplified and is input to two of band-pass-filters 108 to be divided. One of the band-pass-filters has a first passing frequency band in a range of approximately 200–800 kHz, and the other has a second passing frequency band in a range of approximately 75–200 kHz.

Detected signals passing through the above-mentioned two of band-pass-filters 108 are input to a signal analysis device 109 as a contact judge part. Outputs from the two band-pass-filters having different passing band areas are managed at the signal analysis device 109. The signal analysis device 109 includes a function to judge whether the vibration of the glide height evaluation head 104 is caused by a connection with a solid convex part on the magnetic disk, by a connection with a convex part of a lubricant, or by a connection with an air film.

The reason why the magnetic disk 101 is evaluated by dividing the output of the piezoelectric element 114 into the first frequency band in a range of approximately 200–800 kHz and the second frequency band in a range of approximately 75–200 kHz, will be described as follows.

FIG. 10 is a graph showing a result of an evaluation implemented by a magnetic disk evaluation apparatus in a state, where a lubricant is/is not applied on a surface of the magnetic disk and the band-pass-filter has a passing band area in a range of 75–800 kHz.

Figure 10A:
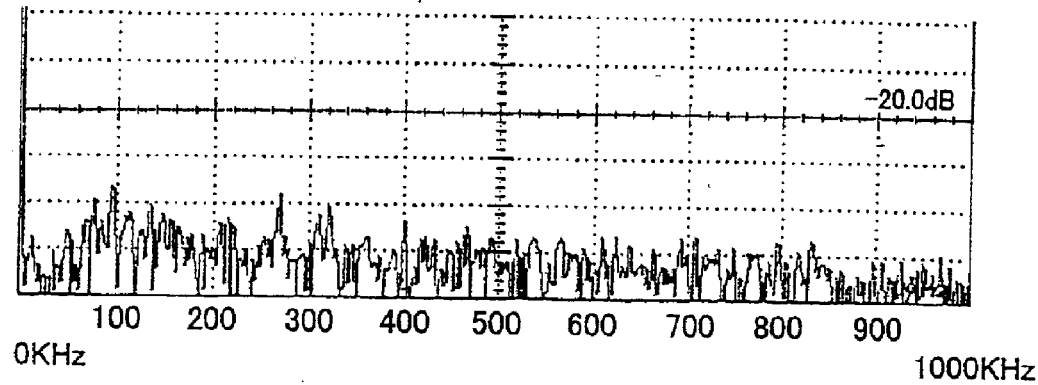
FIG. 10A is a graph showing a result of an evaluation implemented by a magnetic disk evaluation apparatus of the present invention in a state where a glide height evaluation head has a flying-height of 8 nm and a lubricant is not applied on a surface of the magnetic disk.

A spectrum of signal output in a state where the glide height evaluation head runs with a flying-height of 8 nm above a magnetic disk on which a lubricant is not applied, is shown in FIG. 10A. The spectrum is equivalent to a background noise in case of that the glide height evaluation head is not slid with the magnetic disk. That is, a situation of the glide height evaluation head not having a resonance by the air film, is shown in the spectrum.

As a result of a test implemented by varying a number of the rotation of the magnetic disk, when the glide height evaluation head had a relative speed of 34 m/s or more regarding the magnetic disk, a resonance corresponding to an air film which made the glide height evaluation head fly was generated. However, when the glide height evaluation head had a relative speed of 34 m/s or less regarding the magnetic disk, a vibration generated by the resonance of the air film did not occur at the glide height evaluation head, as long as the glide height evaluation head did not come in contact with the convex part on the surface of the magnetic disk.

Figure 10B:
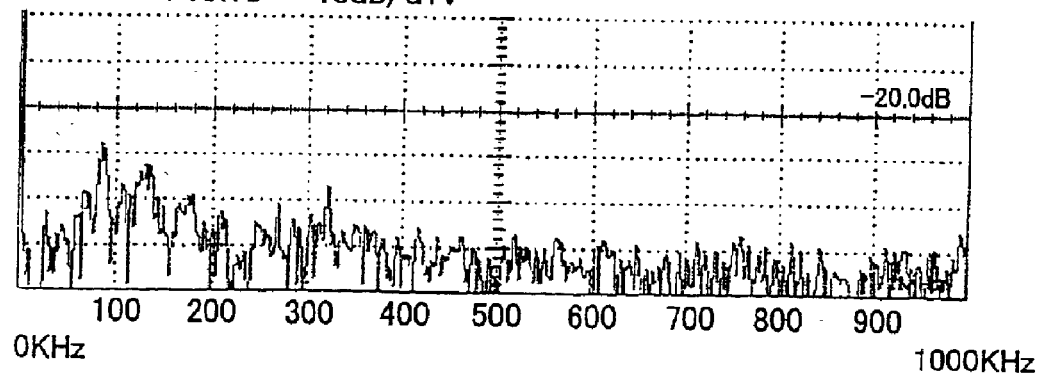
FIG. 10B is a graph showing a result of an evaluation implemented by a magnetic disk evaluation apparatus of the present invention in a state where a glide height evaluation head has a flying-height of 8 nm and a lubricant having an average thickness of 1.2 nm is applied on a surface of the magnetic disk.

Next, a lubricant film having an average thickness of 1.2 nm was applied on the magnetic disk. A spectrum of signal output is shown in FIG. 10B in case of that the glide height evaluation head runs with a flying-height of approximately 8 nm. A signal component in a band area in a range of 80–180 kHz in FIG. 10B is larger than in FIG. 10A. This is because the glide height evaluation head has a resonance. The vibration in this area corresponds to a resonance of an air film causing a flying of the glide height evaluation head.

Comparing a test shown in FIG. 10A and a test shown in FIG. 10B, only whether or not the lubricant is applied on the magnetic disk is different. It may be presumed that the resonance of the air film causing flying of the glide height evaluation head is enhanced by contacting between the glide height evaluation head and the lubricant.

Inventors realized through their experiments that the frequency of the vibration of the glide height evaluation head by lubricant does not exceed 200 kHz.

Figure 10C:
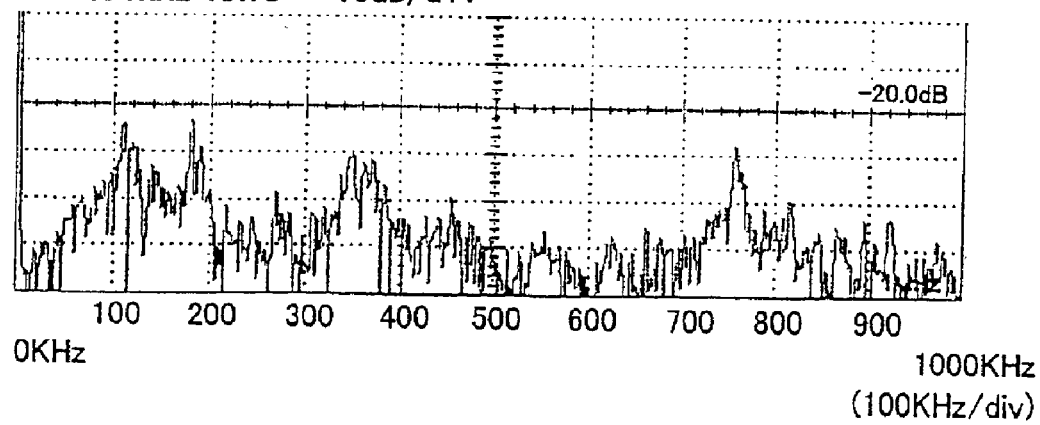
FIG. 10C is a graph showing a result of an evaluation implemented by a magnetic disk evaluation apparatus of the present invention in a state where a glide height evaluation head has a flying-height of 5 nm and a lubricant is not applied on a surface of the magnetic disk.

When the flying-height of the glide height evaluation head was decreased to the flying-height of 5 nm on the magnetic disk on which the lubricant was not applied, where a small, continuous but slight contact occurred, the spectrum shown in FIG. 10C was obtained.

As shown in FIG. 10C, the vibration of the glide height evaluation head due to a resonance of air film is generated in an area in a range of 100–190 kHz. Besides, the vibration corresponding to a characteristic vibration of the glide height evaluation head is realized in an area in a range of 350–760 kHz. This is because the characteristic vibration of the glide height evaluation head is enhanced by contacting the glide height evaluation head and a solid surface of the magnetic disk.

Therefore, according to the test shown in FIG. 10, when the glide height evaluation head is vibrated in an area of a frequency of 200 kHz or less (first frequency band) and not in an area of a frequency over 200 kHz (second frequency band), the glide height evaluation area is come in contact with not the convex part of the solid surface of the magnetic disk but only the lubricant having the convex part on the surface of the magnetic disk.

Besides, when the vibration is generated in a frequency band of at least 200 kHz or more, the glide height evaluation head comes in contact with the convex part on the surface of the magnetic disk.

The magnetic disk evaluation apparatus 100 in the fifth embodiment is utilized for deciding whether or not the lubricant having the convex part on the surface of the magnetic disk comes in contact with the glide height evaluation head, on the basis of the above-mentioned points. In this embodiment, a frequency of 200 kHz is regarded as a threshold frequency, however, a threshold frequency may be designated depending on the glide height evaluation head.

Next, the magnetic disk 101 was evaluated by using the magnetic disk evaluation apparatus 100 of the fifth embodiment shown in FIG. 9 in a state where the glide height evaluation head 104 having a flying-height of 10 nm flied above the magnetic disk 101 on which the lubricant having a film thick ness of 1.2 nm was applied.

Outputs from a filter A and a filter B which will be described later were square-average-processed by the signal analysis device 109. The filter A is defined as a band pass filter having a pass band area in a range of 75–200 kHz corresponding to the second frequency band based on the presumption of a connecting with the convex part of the lubricant. The filter B is defined as a band pass filter having a pass band area in a range of 200–800 kHz corresponding to the first frequency band based on the presumption of a connecting with the convex solid part of the magnetic disk 101. Based on the outputs square-average-processed by the signal analysis device 109, an average value for one rotation regarding respective tracks was calculated, and thereby 20 tracks of each of the magnetic disk 101 were measured.

It was decided by the signal analysis device 109 whether or not the average output values from the filter A and B exceeds the threshold value 50 mV. When the average output value exceeded the threshold value 50 mV, it was decided that the glide height evaluation head came in contact with the convex part. When the output from the filter A was decided as "contact" and the output from the filter B was decided as "non-contact", it was decided that the glide height evaluation head came in contact with only the lubricant by the signal analysis device 109.

Based on the magnetic disk evaluation by the magnetic disk evaluation device 100, 10 pieces of the magnetic disks (the first group) having test results in that 10 or more tracks dame in contact with the only lubricant, 10 pieces of the magnetic disks (the second group) having test results in that 3–9 tracks came in contact with the only lubricant, and 10 pieces of the magnetic disks (the second group) having test results in that less than 2 tracks came in contact with the only lubricant, are prepared.

After the above-mentioned magnetic disk was installed in the magnetic disk device, a test where the magnetic head was sought was implemented 2000 times consequently. Just after the above test was implemented, a test for reading out was implemented to a whole of a surface of the magnetic disk, where the magnetic head had an average flying-height of 18 nm.

As a result of this, an error of reading out by a vibration of the magnetic head occurred in 6 pieces of 10 pieces of the magnetic disks in the first group. An error of reading out by a vibration of the magnetic head occurred in 3 pieces of 10 pieces of the magnetic disks in the second group. No error of reading out by a vibration of the magnetic head occurred in the third group.

A large amount of the lubricant was absorbed on the magnetic head occurring a reading out error by using the magnetic disk in the first and second groups. Therefore, a vibration occurs on the magnetic head in which the contact with the lubricant occurred frequently, and thereby the reading out error might occur.

Hence, according to the magnetic disk evaluation apparatus of the fifth embodiment, it is possible to obtain information with respect to a height of the convex part of the lubricant applied on the surface of the magnetic disk, and decide whether or not the height of the convex part of the lubricant gives bad influence to an operation of the magnetic disk apparatus.

While it is detected that the convex part of the lubricant on the magnetic disk is come in contact with the glide height evaluation head in the magnetic disk evaluation apparatus of this embodiment, it is clear that the magnetic disk evaluation apparatus 100 includes a function of detecting that the glide height evaluation head comes in contact with the convex solid part on the magnetic disk.

It may be desirable that the glide height evaluation head in the first to fourth embodiments may be used as the glide height evaluation head in the fifth embodiment.

The present invention is not limited to these embodiments, but various variations and modifications may be made without departing from the scope of the present invention.

This patent application is based on Japanese priority patent application No. 2001-218130 filed on Jul. 18, 2001, the entire contents of which are hereby incorporated by reference.

What is claimed is:

1. A magnetic disk evaluation apparatus, comprising:
   an evaluation head for evaluating a magnetic disk; and
   a support member for supporting the evaluation head,
   wherein the support member supports the evaluation head in a state where a flying surface of the evaluation head and a surface of a magnetic disk make a flying pitch angle of 95 μrad or more,
   wherein a negative pressure inducing configuration is provided on the flying surface of the evaluation head, and thereby a negative pressure to attract the evaluation head to the magnetic disk on the basis of an airflow caused by a rotation of the magnetic disk is generated, and
   wherein the negative pressure inducing configuration includes an airflow obstacle wall part having a bending part formed at an air inflow side of the flying surface and a straight line part having an air bearing surface through which the airflow inflows beneath the evaluation head.

2. The magnetic disk evaluation apparatus as claimed in claim 1, wherein the support member supports the evaluation head at a position of 0.78L or more from an air inflow end part of the evaluation head, where L is defined as a whole length of the evaluation head in an airflow direction.

3. The magnetic disk evaluation apparatus as claimed in claim 1, wherein a load of 3.5 gf or more is provided to the evaluation head by the support member.

4. The magnetic disk evaluation apparatus as claimed in claim 1, wherein a rigidity of an air film formed between the evaluation head and the magnetic disk is 0.33 gf/nm or more.

5. The magnetic disk evaluation apparatus as claimed in claim 1, wherein a lower limit value of a flying-height of the evaluation head from the surface of the magnetic disk in a state where the glide height evaluation head is not in contact with the magnetic disk is evaluated by the evaluation head.

6. The magnetic disk evaluation apparatus as claimed in claim 1, wherein at least part of the flying surface is formed by a film of a protection material selected from a group consisting of an amorphous carbon, a diamond like carbon, a diamond like carbon to which hydrogen is added, and a diamond like carbon to which nitride is added.

7. The magnetic disk evaluation apparatus as claimed in claim 6, wherein at least part of the formed film of the protection material is fluoride-processed.

8. The magnetic disk evaluation apparatus as claimed in claim 6, wherein a convex part projecting towards the magnetic disk is formed on a part of the formed film of the protection material.

9. A magnetic disk evaluation apparatus including an evaluation head, comprising:

a contact detect means for detecting a contact with a magnetic disk on which a lubricant is applied and outputting a detected signal;

a detected signal dividing means for dividing the detected signal into frequency components of a first frequency band which are generated based on a contact between a convex part of the magnetic disk and the evaluation head, and frequency components of a second frequency band which are generated based on a contact between a convex part of the lubricant and the evaluation head; and a contact decision means which is connected to the detected signal dividing means, and detects a contact of the evaluation head with the convex part of the lubricant in response to detection of a signal component exceeding a designated threshold only in the second frequency band.

10. The magnetic disk evaluation apparatus as claimed in claim 9, wherein the contact decision means further decides that the evaluation head comes in contact with the convex part of the magnetic disk in case a signal component exceeding a designated threshold value at least in the first frequency band is included in the detect signal.

11. The magnetic disk evaluation apparatus as claimed in claim 9, wherein the first frequency band and the second frequency band are separated by a border frequency selected from 100–500 kHz on a basis of a configuration of the evaluation head.

* * * * *